United States Patent [19]
Qureshi

[11] 3,898,593
[45] Aug. 5, 1975

[54] SWITCHABLE RESISTIVE ATTENUATORS

[75] Inventor: Umar Qureshi, Kingston, England

[73] Assignee: The Solartron Electronic Group Limited, Farnborough, England

[22] Filed: Sept. 26, 1973

[21] Appl. No.: 400,862

[30] Foreign Application Priority Data

Oct. 14, 1972 United Kingdom.............. 47518/72

[52] U.S. Cl...................... 333/81 R; 323/80; 323/74
[51] Int. Cl.[2]....................... H03H 7/24; H03H 7/26
[58] Field of Search.......... 333/81 R; 323/8, 79, 74, 323/80, 81, 94; 307/237; 338/200, 201; 328/162, 151; 324/103 P, 115, 119, 120, 128

[56] References Cited

UNITED STATES PATENTS

| | | | |
|---|---|---|---|
| 2,409,474 | 10/1946 | Clapp | 333/81 R X |
| 2,543,797 | 3/1951 | Page | 333/81 R X |
| 3,428,829 | 2/1969 | Haynie et al. | 328/162 X |
| 3,617,959 | 11/1971 | Brander | 333/81 R |
| 3,784,919 | 1/1974 | Azegami | 328/151 |

*Primary Examiner*—Paul L. Gensler
*Attorney, Agent, or Firm*—William R. Sherman

[57] ABSTRACT

An adjustable attenuator comprises first and second inputs, first and second resistors connected in series from the first input, and a switch for selectively connecting the end of the second resistor remote from the first resistor either to the first input or to the second input, the output of the attenuator being taken between the junction between the resistors and the second input. Thus when the switch is in its first state, the two resistors are connected in parallel with each other and in series with the first input, providing an attenuation factor substantially equal to one, while when the switch is in its second state, the two resistors are series connected between the first and second inputs as a potential divider chain.

This arrangement insures that any stray capacitance introduced by the switch is not connected across the output of the attenuator.

4 Claims, 2 Drawing Figures

SWITCHABLE RESISTIVE ATTENUATORS

Figure 1:
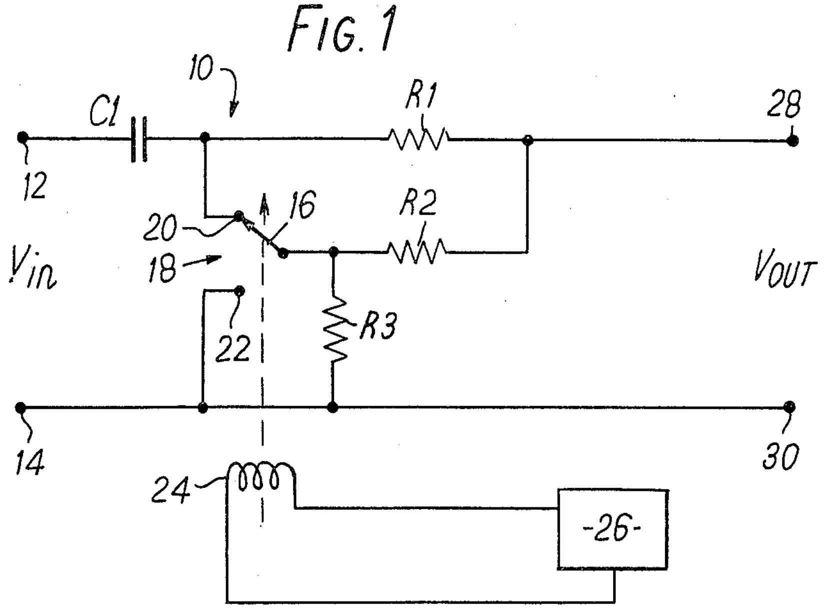

This invention relates to adjustable attenuators, and is more particularly but not exclusively concerned with adjustable attenuators for use in accurate measuring instruments such as digital voltmeters.

Digital voltmeters are commonly provided with adjustable input attenuators in order to extend upwardly the range of input voltages capable of being measured by the voltmeter. Thus if the basic voltmeter, i.e., without the attenuator, is capable of measuring input voltages of up to ten volts, a suitably designed attenuator which is connected in the input of the voltmeter and which has an attenuation factor adjustable between 1:1 and 100:1 will permit the measurement of input voltages of up to 1,000 volts.

Conventional attenuators suitable for this purpose comprise first and second inputs between which a voltage to be attenuated is applied, a plurality of resistors connected in series between the inputs, at least a first output, one or more switching devices such as relays arranged to selectively connect the first output to a selected one of the junctions between the resistors or to the first input, and optionally a second output connected to the second input (although if desired the attenuated output voltage may be taken between the first output and the second input). Thus the resistors constitute a potential divider chain to which the input voltage is applied, and the relay or relays select the point in the divider chain from which the output voltage is taken.

However, the switching contacts of the relays or other switching devices used in these conventional attenuators have an inherent insulation resistance which is effectively connected across the output of the attenuator. Although this insulation resistance is normally relatively high, on some attenuation ranges it may be connected in parallel with quite a high-valued combination of the resistors in the potential divider chain of the attenuator, and may therefore introduce a significant error. Additionally, and more significantly, the relays or other switching devices usually introduce stray capacitance, which is also effectively connected across the output of the attenuator. Thus when the attenuators are used to attenuate alternating voltages, a frequency-dependent error, which increases with increasing frequency, is introduced. Since the magnitude of the stray capacitance is not accurately known, it is difficult to compensate for it. In practice, therefore, manually-adjustable trimmer capacitors are usually provided, normally one for each attenuation range, and these are manually adjusted after assembly of the attenuator to minimise the errors at some arbitrarily chosen frequency. These trimmer capacitors increase the component and manufacturing costs of the attenuators.

It is an object of the present invention to provide an adjustable attenuator in which the effect on the attenuated output signal from the attenuator of the insulation resistance of, and the stray capacitance introduced by, the switching device or devices is reduced, thus reducing errors and obviating the need for trimmer capacitors.

According to the present invention, therefore, an adjustable attenuator comprises first and second inputs between which a voltage to be attenuated may be applied, a first resistance having one end coupled to the first input, a second resistance having one end connected to the other end of the first resistance, an output connected to the junction between the first and second resistances, and switching means having first and second settings in which the other end of the second resistance is respectively coupled to said one end of the first resistance and to the second input, the output voltage from the attenuator appearing between the output and the second input.

Thus in the first setting of the switching means, the two resistances are connected in parallel with each other between the first input and the output, so that, if the attenuator is feeding a load of sufficiently high impedance, its attenuation factor is substantially unity. In the second setting of the switching means, the two resistances are connected in series with each other between the first and second inputs, thus constituting a potential divider chain, so that the attenuation factor of the attenuator is determined by the relative values of the resistances. However, it will be noted that the switching means is not connected to the output of the attenuator, so that the effect of its insulation resistance and any stray capacitance introduced thereby on the attenuation factor of the attenuator is substantially reduced.

Said one end of the first resistance may be directly connected to the first input, or connected thereto via a capacitance.

Advantageously, there may be provided a third resistance connected between the second input and said other end of the second resistance, the value of the third resistance being chosen so that the input impedance of the attenuator is substantially the same when the switching means is in the first and second settings.

Additionally, there may be provided a fourth resistance, and further switching means having first and second settings in which the fourth resistance is respectively short-circuited and connected between said other end of the second resistance and the firstmentioned switching means. In this case there may be provided a fifth resistance connected between said one end of the first resistance and the further switching means, the value and connection of the fifth resistance being such that the input impedance of the attenuator is substantially the same when the firstmentioned switching means and the further switching means are simultaneously in their second and first settings respectively and when the firstmentioned switching means and the further switching means are both simultaneously in their second settings.

The or each of the switching means may comprise a single-pole change-over relay.

Each of the resistances may conveniently comprise a single resistor.

Figure 2:
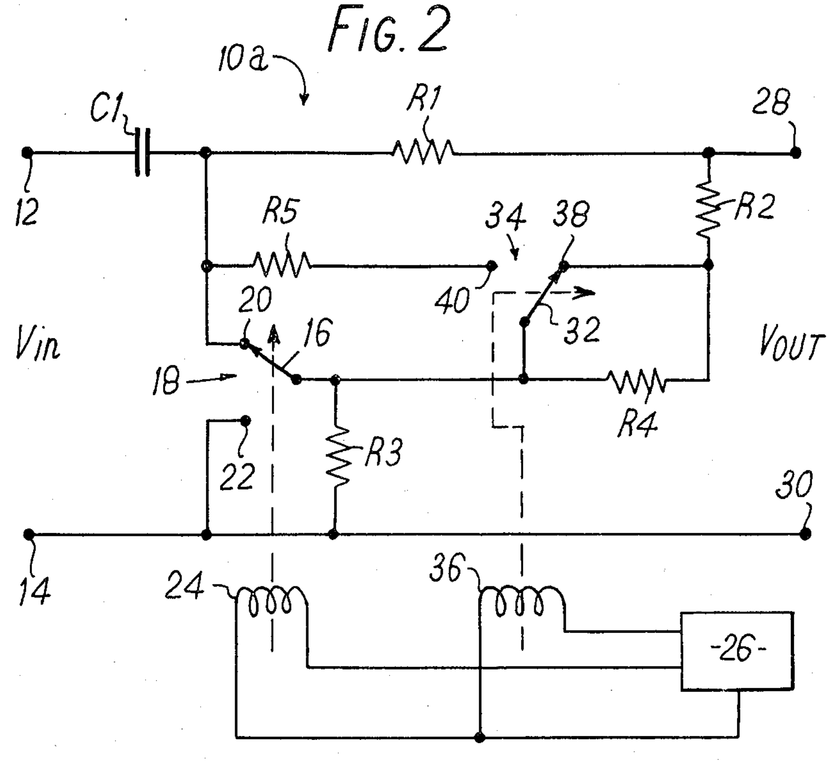

The invention will now be described, by way of non-limitative example only, with reference to the accompanying drawings, of which:

FIG. 1 is a circuit diagram of one embodiment of an adjustable attenuator in accordance with the present invention; and FIG. 2 is a circuit diagram of another embodiment of an adjustable attenuator in accordance with the present invention.

The attenuator shown in FIG. 1 is indicated generally at 10, and comprises first and second input terminals 12, 14 between which an input voltage to be attenuated is applied. The input voltage may typically lie in the range 0–1,000 volts. The input terminal 12 is connected, via a large-value capacitor C1 which provides D.C. isolation, to one end of a first resistor R1, whose other end is connected to one end of a second resistor R2. The other end of the resistor R2 is connected to a movable contact 16 of a changeover relay 18, and is also connected via a third resistor R3 to the input terminal 14.

Typical values of the resistors R1, R2 and R3 are 990 Kilohm, 10 Kilohm and 1 Megohm respectively.

The contact 16 of the relay 18 is movable between a first position (as illustrated in FIG. 1) in which it makes electrical contact with a fixed contact 20 and a second position in which it makes electrical contact with a fixed contact 22. The position of the contact 16 is controlled by a coil 24 forming part of the relay 18, and the coil 24 is connected to be energised by a source 26. The source 26 may merely comprise a manually-operable switch connected between the coil 24 and a suitable power supply: however, where the attenuator 10 forms part of an auto-ranging digital voltmeter, such as the voltmeter described in our co-pending United Kingdom Patent Application No. 45371/71 (U.S. Ser. No. 292,683 filed Sept. 27, 1972, now U.S. Pat. No. 3,772,683), the source 26 will form part of the auto-ranging circuitry of the voltmeter. The contacts 20, 22 are respectively connected to the junction between the resistor R1 and the capacitor C1, and to the input terminal 14.

The junction between the resistors R1 and R2 constitutes the output of the attenuator, and is connected to a first output terminal 28, while a second output terminal 30 is connected to the input terminal 14.

In operation, when the contact 16 of the relay 18 is in its first position (as illustrated in FIG. 1), the resistors R1 and R2 are connected in parallel with each other between the input terminal 12 and the output terminal 28, while the resistor R3 is connected between the junction of the resistor R1 with the capacitor C1 and the input terminal 14. If an alternating input voltage $V_{in}$ is applied between the terminals 12, 14, therefore, the attenuator 10 produces an output voltage $V_{out}$ between the terminals 28, 30 given by $$V_{out} = V_{in} \frac{R_L}{R_p + R_L} \qquad (1)$$

where $R_L$ is the impedance of the load being supplied by the attenuator and $R_P = R1 \cdot R2/(R1+R2)$ Assuming that the load impedance is very high ($> 10^9$ ohms), which is normally the case, this gives $$V_{out} = V_{in} \qquad (2)$$

so that the attenuator 10 has an attenuation factor of substantially unity in this first state thereof.

The input impedance of the attenuator 10 in this first state is simply that provided by the resistor R3, viz. 1 Megohm.

Energisation of the coil 24 by the source 26 moves the contact 16 of the relay 18 to the second position, in which the resistors R1 and R2 are connected in series with each other between the input terminals 12, 14, while the resistor R3 is short-circuited. In this case, again assuming a high impedance load, the output voltage produced by the attenuator 10 is given by $$V_{out} = V_{in} \frac{R2}{R1 + R2} = \frac{V_{in}}{100} \qquad (3)$$

The attenuator 10 thus has, in its second state, an attenuation factor of one hundred.

The input impedance in this second state is given by $R1 + R2$, viz 1 Megohm. Thus it can be seen that the input impedance of the attenuator 10 is the same when the contact 16 of the relay 18 is in either of its two positions. In general, to ensure that the input impedance of the attenuator 10 is the same in its two states, the value of the resistor R3 is selected to be equal to the sum of the values of the resistors R1 and R2.

It can also be seen that the insulation resistance and any stray capacitance introduced by the relay 18 are not connected in parallel with the resistor R2, as is the case in conventional attenuators, but are effectively connected in parallel with the resistor R3, where their effect on the attenuation factor of the attenuator is negligible.

The attenuator shown in FIG. 2 is indicated at 10*a*, and represents an extension of the attenuator 10 of FIG. 1 to provide an additional attenuation range. The attenuator 10*a* employs all the parts of the attenuator 10 of FIG. 1, so these parts have been given the same references: only the additional parts will be described in detail.

Thus, in the attenuator 10*a*, a fourth resistor R4 is inserted between the end of the resistor R2 remote from the junction between the resistors R1 and R2, and the junction between the contact 16 of the relay 18 and the resistor R3. The contact 16 of the relay 18 is connected to a movable contact 32 of a further relay 34, which is identical to the relay 18, and which has a coil 36 connected to be energised from the source 26 independently of the coil 24 in the relay 18. The contact 32 is movable between a first position (as illuustrated in FIG. 2) in which it makes electrical contact with a fixed contact 38, and a second position in which it makes electrical contact with a fixed contact 40. The contact 38 is connected to the junction between the resistors R2 and R4, while the contact 40 is connected via a fifth resistor R5 to the contact 20 of the relay 18.

Typical values of the resistors R4 and R5 are 100 Kilohms and 20 Megohms respectively.

In operation, when the contact 32 of the relay 34 is in its first position, the resistor R4 is short-circuited, and the resistor R5 is open-circuited at the end thereof remote from the contact 20 of the relay 18. In this condition of the relay 34, therefore, the attenuator 10*a* is electrically identical to the attenuator 10, and has first and second states in which its attenuation factor is unity and 100 respectively, in dependence upon the position of the contact 16 of the relay 18. However, when the contact 16 of the relay 18 is in its second position, energisation of the coil 36 by the source 26 moves the contact 32 of the relay 34 to its second position. The resistors R1, R2 and R4 are thus connected in series with each other between the input terminals 12, 14, and the resistor R5 is connected in parallel with the series combination of the resistors R1, R2 and R4; the resistor R3 is, of course, still short-circuited by the contact 16 of the relay 18. The output voltage produced by the attenuator, 10*a*, still assuming a high impedance load, is therefore given by $$V_{out} = V_{in} \frac{R2 + R4}{R1 + R2 + R4} = \frac{V_{in}}{10} \quad (4)$$

The attenuator 10*a* thus has, in this third state thereof, an attenuation factor of 10.

The input impedance of the attenuator 10*a* in its third state is given by $R_{in} = [R5(R1 + R2 + R4)/(R5+R1+R2+R4)] \cong 1$ Megohm, which is the same as its input impedance in its first and second states.

Again, it can be seen that the insulation resistance of, and any stray capacitance introduced by, the additional relay 34 is not connected across the output of the attenuator, so that their effect on the attenuation factor of the attenuator is much reduced.

Several modifications can be made to the described embodiments of the invention. In particular, the relays 18 and 34 can be replaced by suitable manually operable change-over switches, or, in certain applications, by suitable semiconductor switching devices such as field effect transistors or SCRs. Also, the capacitor C1 may be short-circuited or omitted to enable D.C. voltages to be attenuated. Further, it is not strictly necessary for the contacts 20 and 22 to be directly connected to the resistor R1 and the input terminal 14 as shown: they could instead be connected via resistors, whose values would modify the respective attenuation factors in the various states of the attenuators 10, 10*a*.

What is claimed is:

1. A switchable resistive attenuator comprising first and second input terminals between which an A.C. voltage to be attenuated may be applied, a capacitance, a first resistance having one end connected to said first input terminal via said capacitance, a second resistance having one end connected to the other end of the first resistance, an output terminal connected to the junction between the first and second resistances, and switching means having first and second settings for coupling the other end of said second resistance to said one end of said first resistance in the first of said settings and for coupling said other end of said second resistance to said second input terminal in the second of said settings, the output voltage from the attenuator appearing between said output terminal and the second input terminal, whereby the effect of insulation resistance and stray capacitance of the switching means on the magnitude of the output voltage is substantially eliminated.

2. A switchable resistive attenuator comprising first and second input terminals between which an A.C. or D.C. voltage to be attenuated may be applied, a first resistance having one end coupled to the first input terminal, a second resistance having one end connected to the other end of the first resistance, an output terminal connected to the junction between the first and second resistances, and switching means having first and second settings for coupling the other end of said second resistance to said one end of said first resistance in the first of said settings and for coupling said other end of said second resistance to said second input terminal in the second of said settings, the output voltage from the attenuator appearing between said output terminal and the second input, whereby the effect of insulation resistance and stray capacitance of the switching means on the magnitude of the output voltage is substantially eliminated, said attenuator further comprising a third resistance connected between said second input terminal and said other end of the second resistance, the value of the third resistance being chosen to maintain the input impedance of the attenuator substantially the same when the switching means is in the first and second settings.

3. An attenuator as claimed in claim 2 and further comprising a fourth resistance, and second switching means having first and second settings in which said fourth resistance is respectively short-circuited and connected between said other end of said second resistance and said first mentioned switching means.

4. An attenuator as claimed in claim 3 and further comprising a fifth resistance connected between said one end of said first resistance and said second switching means, the value and connection of said fifth resistance being such that the input impedance of the attenuator is substantially the same when the first mentioned switching means and the further switching means are simultaneously in their second and first settings respectively and when the first mentioned switching means and the further switching means are both simultaneously in their second settings.

* * * * *